No. 801,569.  
PATENTED OCT. 10, 1905.  
W. W. CLARK.  
WHEEL.  
APPLICATION FILED APR. 24, 1905.  
2 SHEETS—SHEET 1.
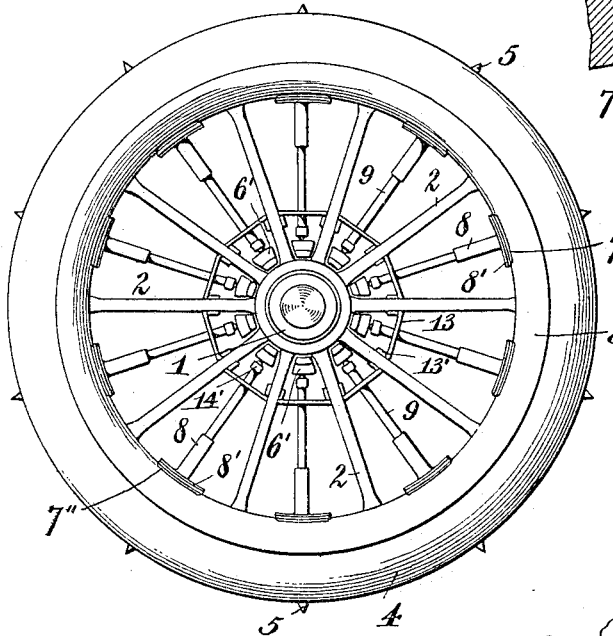
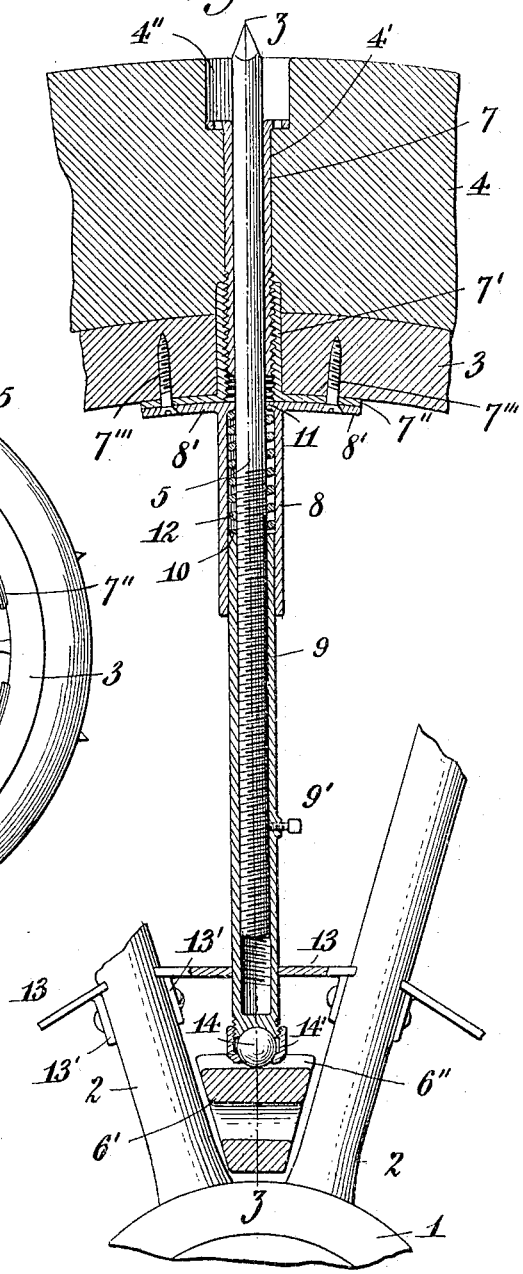
WITNESSES:  
Willie W. Clark, INVENTOR  
BY  
Emil Neuhart  
ATTORNEY.

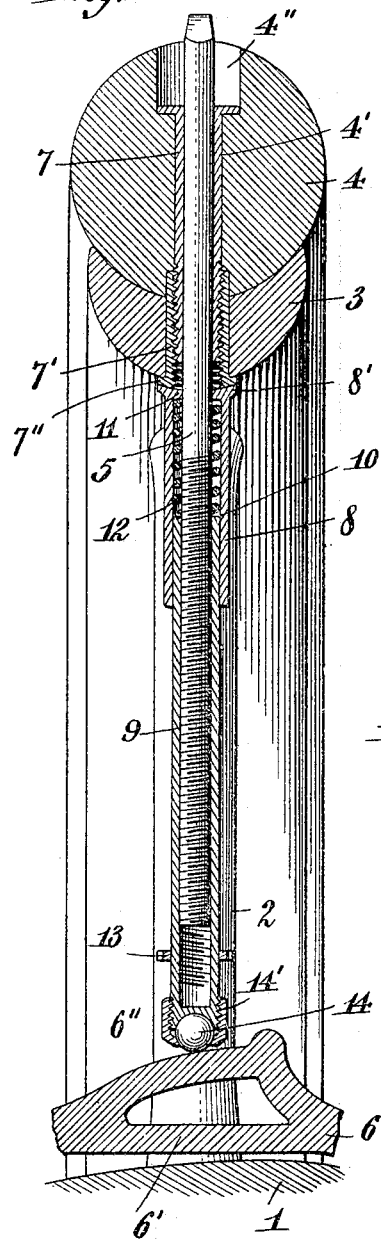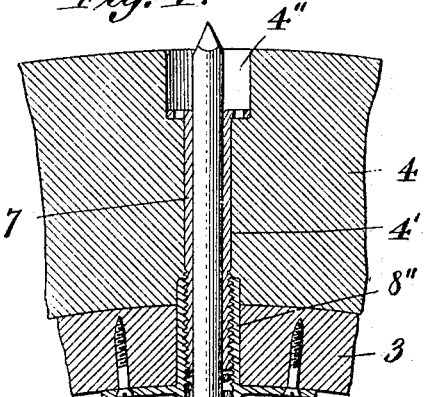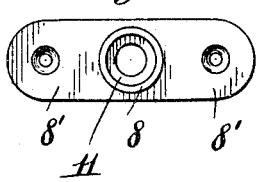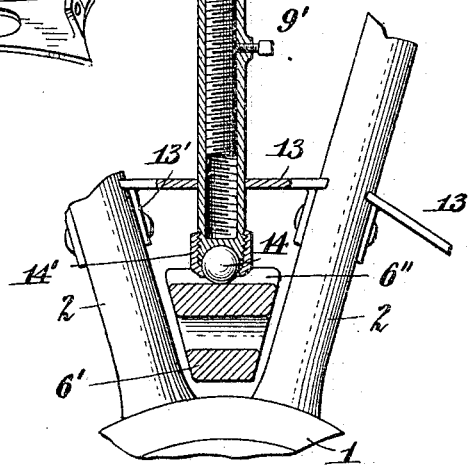

UNITED STATES PATENT OFFICE.

WILLIE W. CLARK, OF BUFFALO, NEW YORK, ASSIGNOR OF ONE-HALF TO GEORGE F. STUMPF, OF BUFFALO, NEW YORK.

WHEEL.

No. 801,569.      Specification of Letters Patent.      Patented Oct. 10, 1905.

Application filed April 24, 1905. Serial No. 257,174.

*To all whom it may concern:*

Be it known that I, WILLIE W. CLARK, a citizen of the United States, residing at Buffalo, in the county of Erie and State of New York, have invented certain new and useful Improvements in Wheels, of which the following is a specification.

My invention relates to improvements in wheels, and more particularly to means for increasing the traction of a vehicle equipped with such wheels.

The object of the invention is to produce a wheel which will be strong and durable and one in which the means for increasing the traction of the vehicle may be adjusted to suit circumstances, such means being simple and easy of manipulation.

With these objects in view the invention consists of a wheel having a series of spurs or projections radiating from the center or hub and passing through the rim and felly of the wheels, said spurs having incased springs which tend to force the spurs inward.

It further consists in the novel means for guiding the spurs in their movement, and in certain novel features of construction and combination of parts, as hereinafter set forth.

In the drawings I have illustrated one example of the complete physical embodiment of my invention and a modification thereof.

Figure 1 is a side elevation of a wheel embodying the features of my invention. Fig. 2 is an enlarged longitudinal sectional view through a portion of a wheel-felly and one of the spurs. Fig. 3 is a sectional view on line *z z*, Fig. 2. Fig. 4 is a view similar to Fig. 2, showing a slight modification. Fig. 5 is a plan view of one of the guide-sleeves. Fig. 6 is a detached perspective view of one of the detachable guides for the spurs.

Referring to the drawings, the numeral 1 designates the hub of a wheel of ordinary construction provided with usual spokes, as 2, felly or rim 3, and tire 4. The radial spurs 5 are adapted to have their outer ends projected beyond the periphery of the wheel by means of a cam-sleeve 6, which surrounds the hub and is provided with arms, as 6', located between the spokes. These cam-arms are inclined, as at 6", and movable to ride under the inner ends of the spurs 5 to force the outer ends of the latter outside the periphery of the wheel. Said cam-sleeve may be actuated in any approved manner, and as its construction and manner of receiving support form no part of this invention no detail description need be given of the same.

The tire 4 is provided with radial openings 4', having an enlarged portion or opening 4" at the periphery of the wheel. A sectional guide-sleeve is fitted into these openings 4', said sleeve consisting of two parts, one part 7 being provided with a flange which rests in the bottom of the enlarged opening 4" and holds the part or sleeve 7 in place. This sleeve is inserted from the outer periphery of the wheel, as will be understood. The other section or part 7' of the guide-sleeve is provided with lugs 7" and is inserted from the inner periphery of the rim or felly, lugs 7" lying against the felly and secured thereto by screws 7'''. The two parts 7 and 7' are screw-threaded and screw together, as shown.

A guide-sleeve 8, provided with securing-lugs 8', is screwed to the inner side of the rim of the wheel. The lugs 8', formed on the sleeve 8, are preferably located against the lugs 7" of the sleeve 7', and both sets of lugs are securely held to the rim of the wheel by the screws 7'''.

The spurs which are located in the guide-sleeves 7, 7', and 8 are formed of two sections, as indicated at 5 and 9. The member 5 is a rod with a sharpened or tapering outward end and provided at its inner end with external screw-threads. Rod 5 is screwed within the sleeve 9 and provides a shoulder 10 inside the sleeve 8, into which sleeve the member 9 is inserted. A shoulder or annular lug 11 is formed at the upper end of the sleeve 8, and between this shoulder 11 and the shoulder 10 of sleeve 9 a spiral spring 12 is located, which tends to force the spurs inward. The extent of projection of the spurs can be varied by adjusting the rod 5 within sleeve 9, and, if desired, the two parts can be locked in their adjusted position by a set-screw 9', as shown in Fig. 2.

Each of the spurs is guided in a guide-plate 13, which is located between the pairs of spokes and provided with ears 13', by means of which the guides are secured to the spokes of the wheel.

The lower end of each spur portion or sleeve 9 is provided with an antifriction-ball 14, held thereto by a cap 14'. The cap is screwed to the lower end of the sleeve 9 and is open at its lower end to permit the ball to project beyond the lower end thereof and rest upon the projecting cam-sleeve 6, which surrounds the hub.

As will be seen, the spurs 5 can be easily removed without disarranging any of the other parts of the device, or, if desired, the entire spur, including the rod 5 and sleeve 9, may be removed by first removing rod 5, unscrewing cap 14' from sleeve 9, and then withdrawing sleeve 9 through the guide-plate 13.

In the modification shown in Fig. 4 the guide-sleeve 8 is formed with an extension or sleeve 8'', which passes through the wheel-rim and enters the tire to receive the sleeve 7.

Having thus fully described my invention, what I claim as new, and desire to secure by Letters Patent, is—

1. The combination in a wheel having a series of perforations in its tire, of a spur adapted to project through each of said perforations, separate guide-plates held between the spokes of the wheel in which the spurs are guided, each plate having ears lying against the spokes and secured thereto, a guide-sleeve secured in each perforation of the tire and means for projecting the spurs through said perforations.

2. A wheel having a series of radiating spurs adapted to project beyond the periphery thereof; each of said spurs consisting of a sleeve and a rod secured therein and projecting through the rim of the wheel, guides for said spurs, and means for projecting the outer ends of said spurs through the wheel-tire.

3. The combination in a wheel, of a series of spurs adapted to project beyond the wheel-tire, each of said spurs consisting of a threaded sleeve having a cap and bearing-ball at one end and a rod having a tapered end and screwed into said sleeve, springs for holding said spurs in withdrawn position, and means for projecting the outer ends of said spurs beyond the periphery of the wheel-tire.

4. A wheel having a series of perforations in the tire, spurs formed of screw-threaded rods secured in complementarily-threaded sleeves, sleeves secured to the tire inclosing a part of the spurs, means for withdrawing said spurs, and means for projecting the outer ends of said spurs beyond the periphery of the tire.

5. The combination in a wheel having a series of perforations in its tire, of a series of spurs adapted to be projected through said perforations, each of said spurs consisting of a sleeve member and a rod secured therein, a guide-sleeve secured in each perforation of the tire, a second guide-sleeve for each spur secured to the inner periphery of the tire and partly inclosing the sleeve member of the spur, springs adapted to withdraw the spurs and means for projecting the outer ends of said spurs beyond the periphery of the wheel-tire.

6. The combination in a wheel having a series of perforations in its tire, of a spur adapted to project through each of said perforations, a guide-sleeve for each spur secured to the inner periphery of the rim, springs between said guide-sleeves and the spurs, guide-plates secured between the spokes of the wheel in which the spurs are guided and means for projecting the outer ends of said spurs beyond the periphery of the wheel.

7. The combination in a wheel having a series of perforations in its tire, of a spur adapted to project through each of said perforations, a guide-sleeve for each spur secured to the inner side of the tire, springs for withdrawing said spurs, guide-plates secured between the spokes of the wheel in which the spurs are guided and a cam-sleeve at the center of the wheel adapted to project the spurs beyond the periphery of the wheel-tire.

8. The combination in a wheel having a series of perforations in its tire, of a series of spurs adapted to be projected through said perforations, each of said spurs consisting of a sleeve member and a rod secured therein, a guide-sleeve for each spur secured to the rim of the wheel, springs between said guide-sleeves and the sleeve members of the spurs, guide-plates located between the spokes of the wheel, and a cam-sleeve surrounding the hub of the wheel adapted to project said spurs beyond the periphery of the wheel.

In testimony whereof I have affixed my signature in the presence of two subscribing witnesses.

WILLIE W. CLARK.

Witnesses:
MAY F. SEWERT,
EMIL NEUHART.